United States Patent [19]
Miyazato et al.

[11] Patent Number: 5,720,469
[45] Date of Patent: Feb. 24, 1998

[54] ELECTROMAGNETIC VALVE

[75] Inventors: Kazuo Miyazato, Kariya; Masahiro Mochizuki, Okazaki, both of Japan

[73] Assignee: Aisin Seiki Kabushiki Kaisha, Aichi-pref., Japan

[21] Appl. No.: 678,306

[22] Filed: Jul. 11, 1996

[30] Foreign Application Priority Data

Jul. 20, 1995 [JP] Japan ................................. 7-183726

[51] Int. Cl.⁶ ................................................ F16K 31/06
[52] U.S. Cl. ............................ 251/129.21; 251/129.15
[58] Field of Search ................. 251/129.15, 129.21; 137/625.65

[56] References Cited

U.S. PATENT DOCUMENTS

| 3,420,496 | 1/1969 | Hallberg | 251/129.15 |
| 4,067,541 | 1/1978 | Hunter | 251/129.15 |
| 4,944,486 | 7/1990 | Babitzka | 251/129.15 X |

FOREIGN PATENT DOCUMENTS

| A-3818109 | 12/1988 | Germany . |
| 8904785 U | 9/1990 | Germany . |
| A-4202389 | 8/1993 | Germany . |
| A-4419875 | 12/1994 | Germany . |
| 5-40195 | 8/1985 | Japan . |

*Primary Examiner*—Kevin Lee
*Attorney, Agent, or Firm*—Hazel & Thomas

[57] ABSTRACT

A two-port electromagnetic valve is disclosed. The electromagnetic valve incorporates a first port, a second port and a passage for communicating the first and second ports and a cylindrical bobbin having an electrical coil. A fixed core is arranged inside the cylindrical bobbin and has an inner space defined therein. A movable core is arranged near the fixed core. A valve is connected with the movable core for opening and closing the passage between both the ports. An insert member is arranged into the inner space of the fixed core.

5 Claims, 4 Drawing Sheets

PRIOR ART

5,720,469

ELECTROMAGNETIC VALVE

FIELD OF THE INVENTION

The present invention relates to an electromagnetic valve.

BACKGROUND OF THE INVENTION

Japanese Patent Publication Number Hei. 5-40195 discloses a three-port electromagnetic valve. In FIG. 7, which illustrates this electromagnetic valve, the electromagnetic valve 100 basically includes a body 102, a coil 104, a movable core 106, a fixed core 108 and valves 110, 112. The body 102 is made of synthetic resin and has a first port 114, a second port 116, a passage 115 and a bobbin 118. The passage 115 communicatively connects the first port 114 with the second port 116. The fixed core 108 has a third port 109. An inner surface of the bobbin 118 is cylindrically shaped. The movable core 106 and the fixed core 108 are made of magnetic material and are arranged in an inner space of the bobbin 118. There is a clearance 119 between an outer surface of the movable core 106 and an inner surface of the bobbin 118. The clearance 119 is used as a passage for communicating the third port 109 with the first port 114. The valve 110 and the valve 112 are fixed to both sides of the movable core 106, respectively. The valve 110 closes the passage 115 and the valve 112 closes the third port 109. A coil spring 120 is arranged between the movable core 106 and the fixed core 108.

In operation, when an electrical signal is not applied to the coil 104, the coil spring 104 urges the movable core 106 to slide to the left direction as shown in FIG. 7. Therefore, the valve 112 is opened and the first port 114 is brought into communication with the third port 109. When an electrical signal is applied to the coil 104, the magnetic force of the coil 104 makes the movable core 106 slide to the right direction, as shown in FIG. 7. Therefore, the valve 110 is opened and the first port 114 is brought into communication with the second port 116.

Since the fixed core 108 of the electromagnetic valve 100 is made of magnetic material and the third port 109 is formed by cutting and boring the fixed core 108, the cost of manufacturing the electromagnetic valve 100 is relatively high.

Alternatively, a two-port type electromagnetic valve which basically includes a body, a coil, a movable core, a fixed core and a valve does not need a third port into the fixed core.

In a two-port type electromagnetic valve, the fixed core is not provided with a port. Therefore, the fixed core for the two-port type electromagnetic valve is not interchangeable with the fixed core of the three-port type electromagnetic valve. Accordingly, when manufacturing both types of electromagnetic valves, it is necessary to manufacture and stock two types of fixed cores.

SUMMARY OF THE INVENTION

Accordingly, it is an object of the present invention to provide an electromagnetic valve without the foregoing drawbacks.

In accordance with the present invention, an electromagnetic valve comprises a valve body having a first port, a second port and a passage for communicating therebetween; a cylindrical bobbin having an electromagnetic coil; a fixed core arranged inside the cylindrical bobbin and having an inner space; a movable core arranged near the fixed core; a valve connected with the movable core for opening and closing the passage between the first and second ports; and an insert member arranged into the inner space of the fixed core.

Other objects and advantages of the invention will become apparent during the following discussion of the accompanying drawings.

BRIEF DESCRIPTION OF THE DRAWINGS

The foregoing and additional features of the present invention will become more apparent from the following detailed description of the preferred embodiments thereof when considered with reference to the attached drawings in which.

DETAILED DESCRIPTION OF THE PREFERRED EMBODIMENTS

Figure 1:
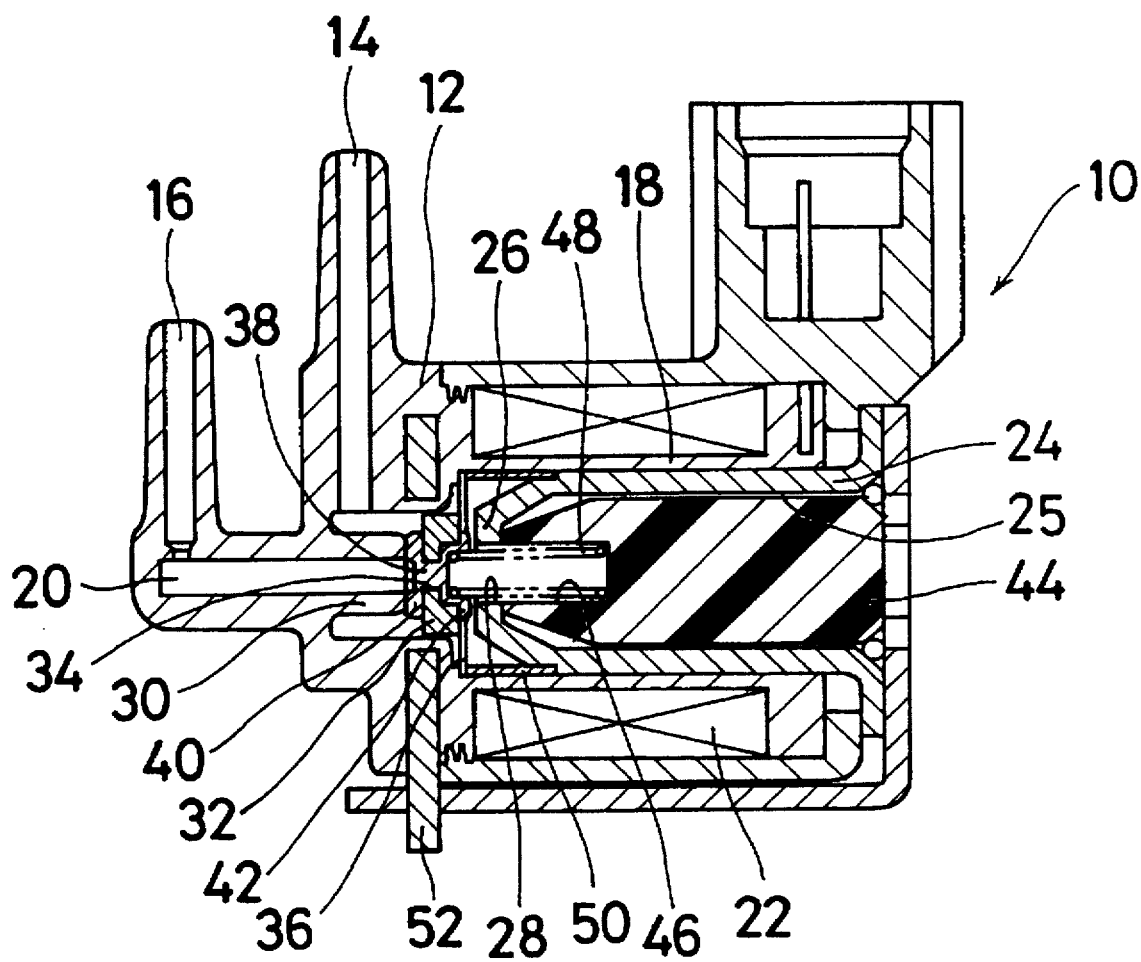
FIG. 1 is a sectional view of the first embodiment of an electromagnetic valve in accordance with the present invention.
Figure 2:
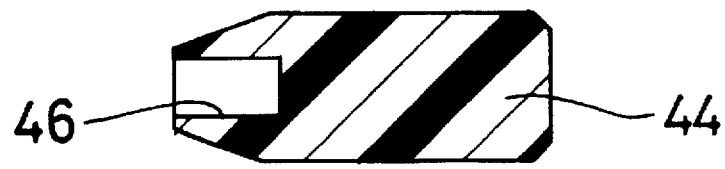
FIG. 2 is an enlarged sectional view of an insert member shown in FIG. 1.

Referring first to FIGS. 1 and 2, there is shown the first preferred embodiment of the two-port type electromagnetic valve 10 of the present invention.

The electromagnetic valve 10 has a body 12. The body 12 is made of synthetic resin and has a first port 14, a second port 16, a cylindrical bobbin 18 and a passage 20. The passage 20 communicates between the first port and the second port 14. A coil 22 is wound on the outer surface of the cylindrical bobbin 18. The inner surface of the cylindrical bobbin 18 is cylindrically shaped with a fixed core 24 inserted into the bobbin 18, wherein a fluid-tight seal is formed between the bobbin 18 and the fixed core 24. The fixed core 24 is made of magnetic material and is cylindrically-shaped for defining therein an inner space 25. The inner end of the fixed core 24 has a bottom 26. The center of the bottom 26 has an opening 28. A movable core 32 is arranged between the end of a pipe 30 and the bottom 26 of the fixed core 24. The center of the movable core 32 has an opening 34. The right side surface of the movable core 32 attached to a ring leaf spring 36. The left side surface of the movable core 32 attaches to a valve 38. The valve 38 is made of synthetic resin or rubber. One end part 40 of the valve 38 is opposite to the end of the pipe 30 and the other end part 42 of the valve 38 rests on the surface of the ring leaf spring 36 through the opening 34. As shown in FIG. 2, an insert member 44 has a blind bore 46. The insert member 44, which is made of synthetic resin, is inserted in the inner space of the fixed core 24. A coil spring 48 is arranged into the hollow 46. A holder 50 is made of stainless steel and holds an outer periphery of the ring leaf spring 36. A magnetic plate 52 is fixed within the body 12 and constitutes a part of a magnetic circuit when an electrical signal is applied to the coil 22.

The operation of the above-described electromagnetic valve 10 will be explained.

Figure 3:
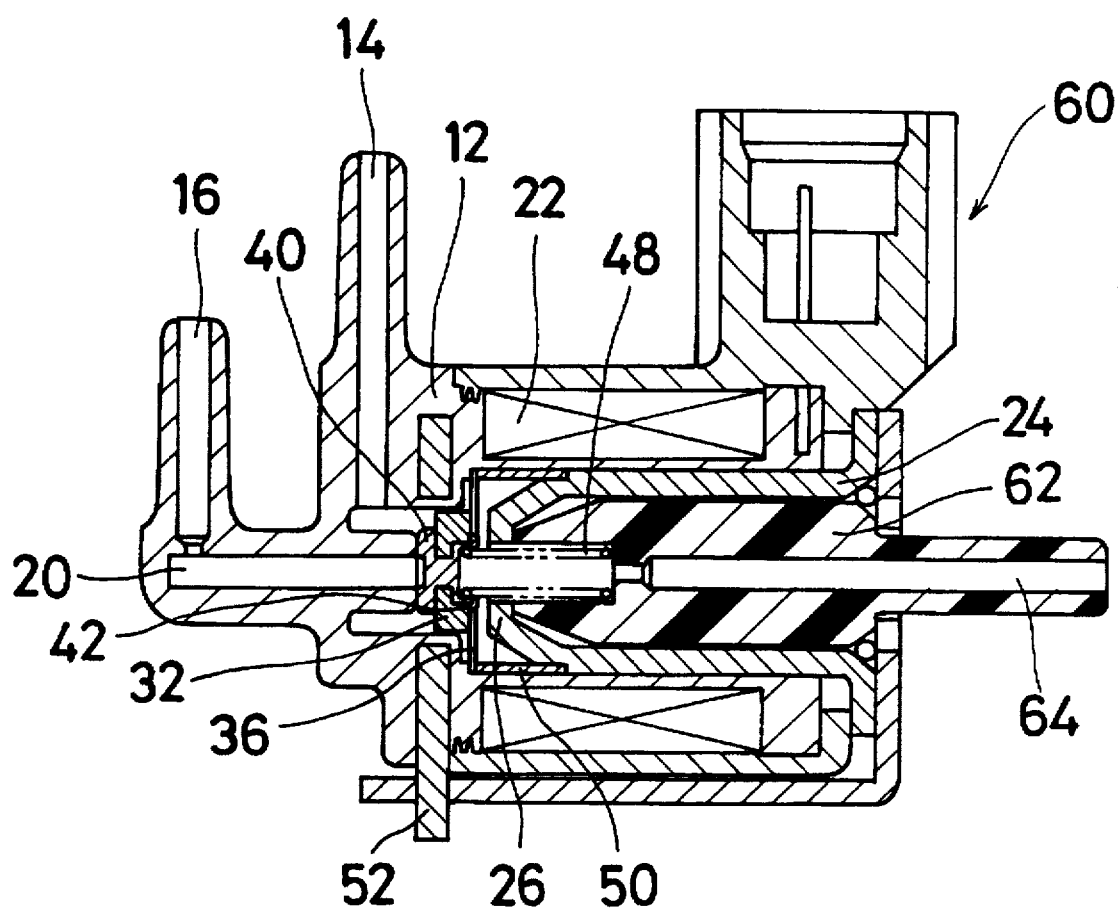
FIG. 3 is a sectional view of the second embodiment of an electromagnetic valve in accordance with the present invention.
Figure 4:
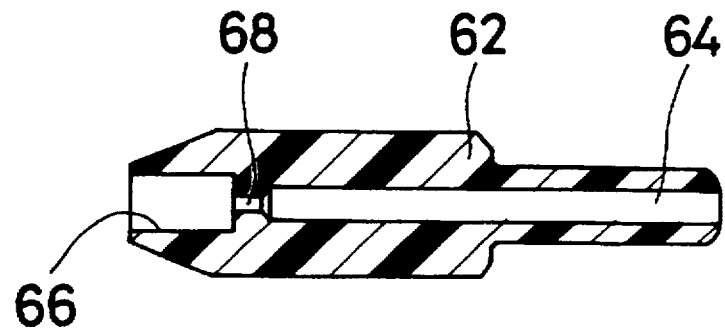
FIG. 4 is an enlarged sectional view of an insert member shown in FIG. 3.

When an electrical signal is not applied to the coil 22, the coil spring 46 urges the movable core 32 to slide in the left direction, as shown in FIG. 3. Therefore, the end part 40 of the valve 38 closes the passage 20 and the end part 42 of the valve 38 is opened by its moving away from the bottom 26 of the fixed core 24. Accordingly, the first port 14 is brought into communication with the third port 64. When an electrical signal is applied to the coil 22, the magnetic force of the coil 22 makes the movable core 32 slide in the right direction against the force of the coil spring 46, as shown in FIG. 3. Therefore, the end part 40 is opened by its moving away from the end of the pipe 30 and the end part 42 closes the blind bore 66. Accordingly, the first port 14 is brought into communication with the second port 16.

All parts, except the insert member 44 and 62, are interchangeable between the two-port type electromagnetic valve 10 and the three-port type electromagnetic valve 60. Further, the insert member 62 is made of synthetic resin, thereby making the incorporation of an elimination port 64 into the insert member 62 easy.

Figure 5:
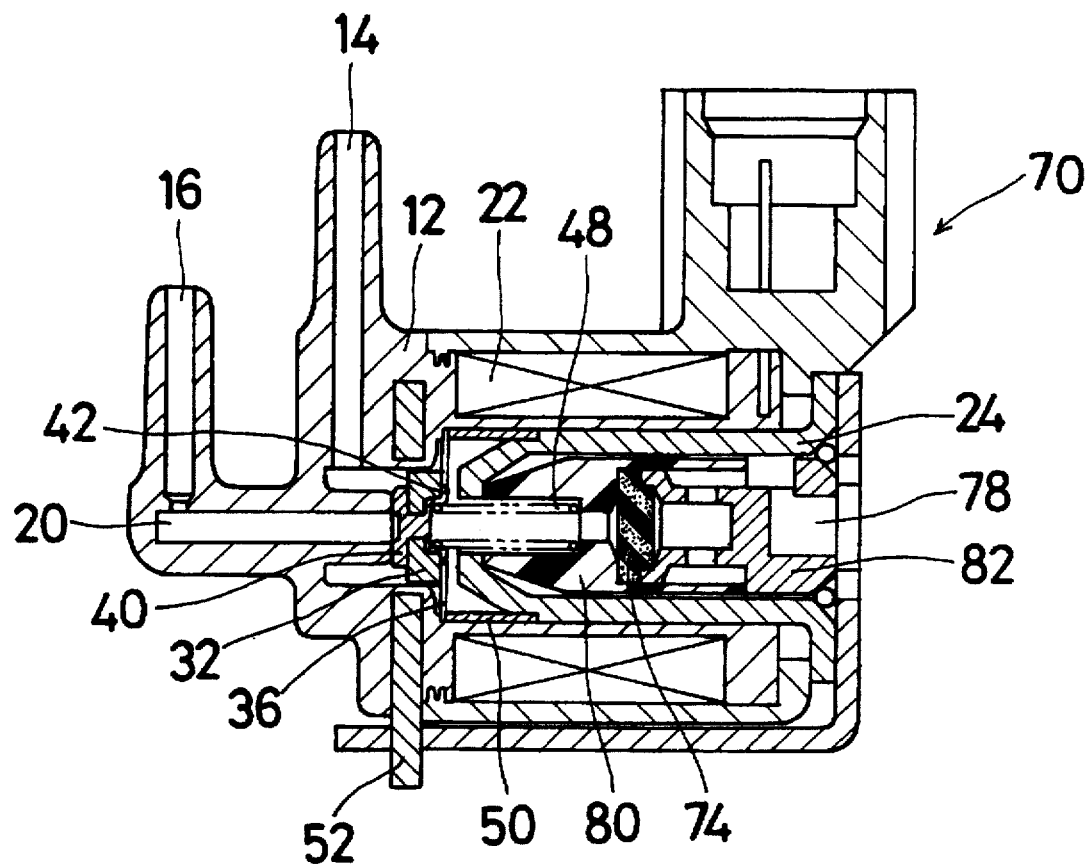
FIG. 5 is a sectional view of the third embodiment of an electromagnetic valve in accordance with the present invention.
Figure 6:
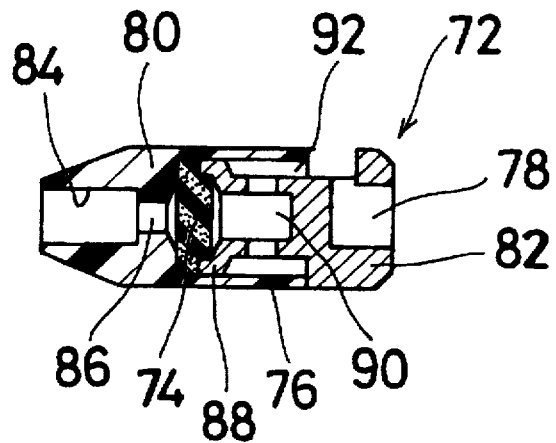
FIG. 6 is an enlarged sectional view of an insert member shown in FIG. 5.
Figure 7:
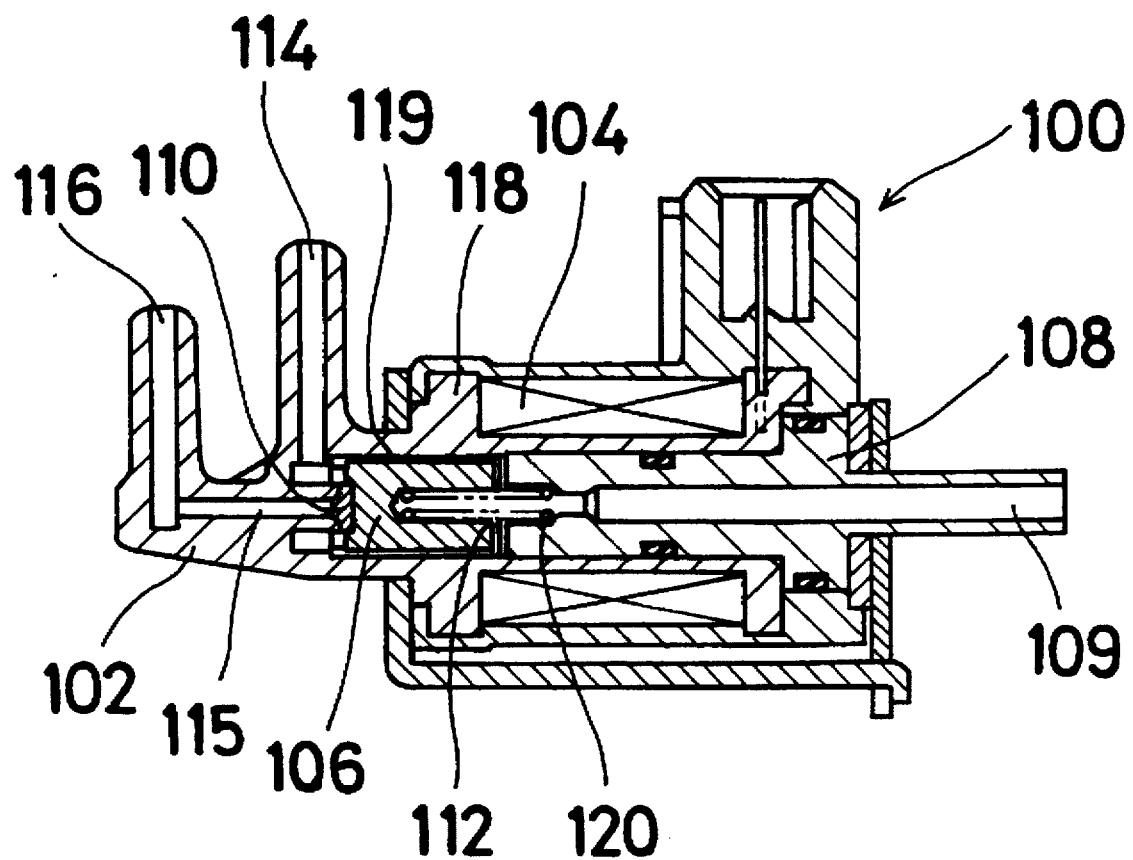
FIG. 7 is a sectional view of a three-port type electromagnetic valve in accordance with the prior art.

FIGS. 5 and 6 illustrate a third embodiment of the present invention. As shown in FIG. 5, the three-port type electromagnetic valve 70 is structurally different from the three-port type electromagnetic valve 60 shown in FIG. 3. As shown in FIG. 6, an insert member 72 is composed of a filter structure. The filter structure includes a top member 80 and a bottom member 82. The top member 80 has a cylindrical member 76, a blind bore 84 and an orifice 86. The bottom member 82 has a filter holding member 88, a hollow path 90, a path 92 and a third port 78. A filter 74 is arranged between the top member 80 and the bottom member 82, and the filter 74 is arranged into a passage between the third port 78 and the orifice 86. This passage from the third port 78 to the orifice 86 is formed by the path 92, the hollow 90 and the filter 74, which are arranged in that order. Therefore, if the fluid through into the third port 78 includes some impurities, for example dust and water, the impurities will be eliminated from the fluid. In addition, the filter 74 is included in the insert member 72, whereby the three-port type electromagnetic valve 70 does not increase in size as a result of incorporating the filter 74.

While the invention has been described in connection with one of its preferred embodiments, it should be understood that changes and modifications may be made without departing from the scope of the appended claims.

What is claimed is:

1. An electromagnetic valve comprising:
   a valve body having a first port, a second port and a passage for communicating between the first and second ports;
   a cylindrical bobbin having an electromagnetic coil;
   a fixed core sleeve arranged inside the cylindrical bobbin and having an inner space defined therein;
   a movable core positioned adjacent the fixed core sleeve;
   a valve connected with the movable core for opening and closing the passage between the ports; and
   an insert member removably positioned in the inner space of the fixed core sleeve so as to be removably interchangeable from said fixed core sleeve without requiring changing of other components of said electromagnetic valve, said insert member being formed from a synthetic resin.

2. An electromagnetic valve according to claim 1, wherein the fixed core sleeve is formed as a cylinder with a bottom having a hole defined therein for accommodating a spring.

3. An electromagnetic valve according to claim 2 wherein the insert member has an elimination port.

4. An electromagnetic valve according to claim 3 wherein the elimination port includes a filter.

5. An electromagnetic valve according to claim 1 wherein a plate spring is arranged between the sleeve and the movable core.

\* \* \* \* \*